Oct. 23, 1951  E. MILLMATHER, JR  2,572,275
METHOD OF SURFACE ORNAMENTATION
Filed Feb. 24, 1950
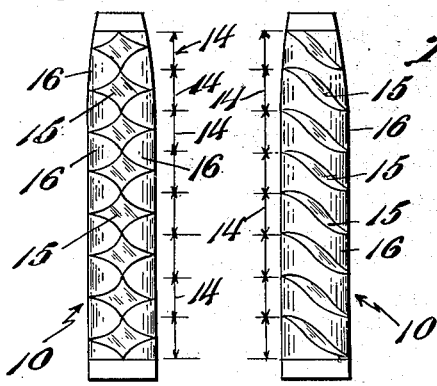
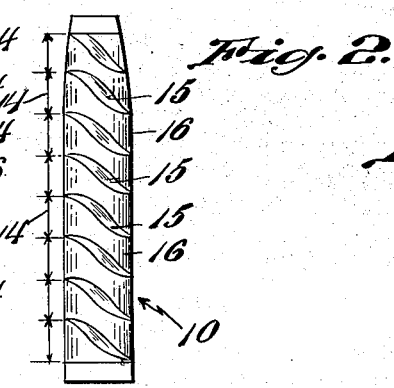
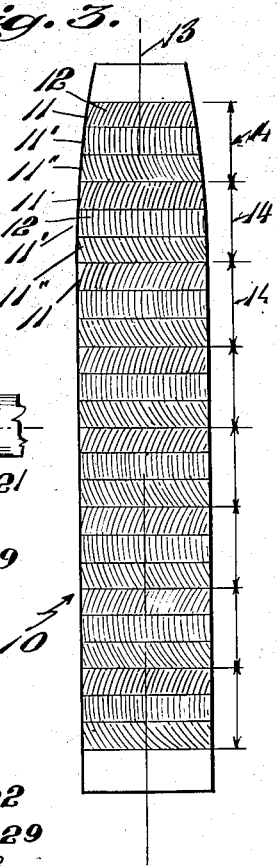
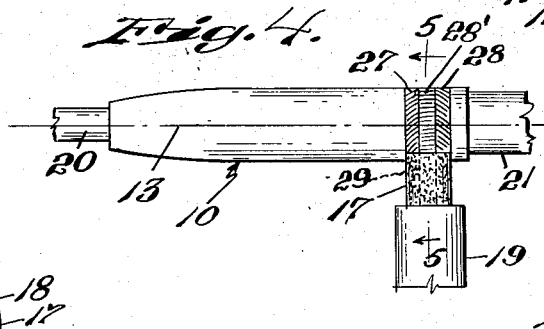
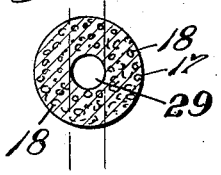
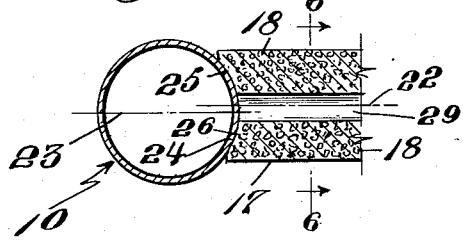
INVENTOR.
Ernest Millmather Jr.
BY
Barlow & Barlow
ATTORNEYS.

Patented Oct. 23, 1951

2,572,275

UNITED STATES PATENT OFFICE 2,572,275

METHOD OF SURFACE ORNAMENTATION

Ernest Millmather, Jr., Johnston, R. I.

Application February 24, 1950, Serial No. 146,021

3 Claims. (Cl. 41—18)

This invention relates to an improved method of surface ornamentation for a cylindrical article.

The general object of this invention is to provide a method of surface ornamentation for a cylindrical article which will produce reflecting surface areas arranged in a definite order along the length of the article whereby such surfaces will reflect light therefrom in a definite repeated pattern of high and low lights relative to a common point.

A more specific object of this invention is to provide a surface ornamentation for cylindrical articles by abrading the surface of the article so as to form repeated areas of microscopic grooves or lineation of reflecting surfaces with the lines in one area extending in a different direction from the lines in the adjacent areas so as to produce different surface light reflecting effects arranged in a definite pattern along the article ornamented.

With these and other objects in view, the invention consists of certain novel features, as will be more fully described and particularly pointed out in the appended claims.

In the accompanying drawings:

Figure 1 is an elevational view of a fountain pen cap illustrating ornamentation thereon embodying the invention;

Figure 2 is a similar view showing a change of pattern design thereon;

Figure 3 is an elevational view of a fountain pen cap on an enlarged scale showing the manner of producing the ornamentation shown in Figures 1 and 2;

Figure 4 is a plan view of an apparatus for producing the ornamentation shown in Figure 1;

Figure 5 is a sectional view taken substantially along line 5—5 of Figure 4;

Figure 6 is a sectional view taken substantially along line 6—6 of Figure 5.

In carrying out my invention I form on the article to be surface ornamented, by way of example a metal fountain pen cap 10, a plurality of circumferential band areas 11, 11', 11" with different light reflecting surfaces thereon. The reflecting surface on any of said band areas is arranged to reflect light rays falling thereon at angles different from the angle of reflection of the surface on the next adjacent band area with respect to a common viewpoint. The said reflecting surfaces are provided by forming on the surface of each of said areas 11, 11', 11" a multiplicity of microscopic grooves or lineations 12, with all of said lines in one area extending in the same general direction but at an angle different from the lines 12 in the next adjacent area. Thus, two adjacent reflecting surfaces are made wherein the light rays falling thereon will be reflected at different angles relative to a common viewpoint. The said lines 12 are formed on band area 11 to extend at an angle to the lines in area 11" and to the longitudinal axis 13 of the cap 10, while the lines in the intermediate band area 11' are formed to extend generally in the direction of the said axis 13. Thus, there is formed a repeated pattern of groups of band areas 14 with lustrous surfaces reflecting light rays emanating therefrom at different angles to each other relative to a common viewpoint. This provides a definite pattern of high lights 15 (see Figure 1) defined by a definite pattern of low lights 16 for each group 14 of said areas 11, 11' and 11". The pattern of high and low lights 15 and 16 changes to various form as the angle between said common viewpoint and the said article changes. One variation of the pattern is shown in Figure 2 wherein the high lights 15 are of elongated generally angular form. The pattern or design made by the high and low lights 15 and 16 also moves or has the appearance of moving over the surface of the cap as the said cap and light rays falling thereon move relative to each other.

In some instances I may form the said lineations in bands of narrow areas extending helically along the surface of the cap 10 whereby producing a design of high and low lights extending helically over the surface of the cap 10.

The said lineations 12 may be formed on the surface of the article to be embellished by any appropriate means which may present itself to those skilled in this art. As an example, I have shown in Figures 4 and 5 a manner of forming the said lineations 12, which has proven in actual production to be both practical and inexpensive to produce. This comprises a polishing operation in which I use a hollow circular abrasive tool 17 made of a somewhat yieldable rubbery material in which there is embedded an abrasive material 18. The grade of this abrasive 18 may be coarse or fine depending upon the degree of high lustre surface desired. The tool 17 is mounted on a holder 19 which may be of any conventional type and arranged to rotate at a relatively high velocity.

The cap 10 is placed between rotatively mounted supports 20 and 21 so that the cap may be rotated relative to the tool 17. The tool 17 (see Figure 5) is mounted so that the axis 22 about which it rotates will be off center with respect to the horizontal axis 23 of the cap, in this case, above the center. The tool 17 is moved into contact with the cap 10 with sufficient pressure to distort the engaging surface 24 thereof, as shown in Figure 5, so as to conform to the outer surface of the cap 10. The abrasive tool rotating at a high speed will cut a multiplicity of arcuate lines in the surface of the cap engaged thereby. The tool 17 is maintained in contact with the cap 10 for one complete revolution of said cap and then moved out of contact therewith. The tool is next advanced axially of the work for a distance equal to its diameter and moved into contact with the cap for another revolution of the said cap 10. The tool is again removed from contact with the cap to be again similarly advanced and moved into engagement with the cap. This procedure is continued until the entire length of the surface to be ornamented has been acted upon.

Referring to Figure 5, it will be seen that a larger area 25 of cap surface above the axis 23 than the surface 26 below the said axis 23 is engaged by the tool 17. Consequently, there will be made a greater number of lines in the area 25 extending in one direction than the number of lines made in the opposite direction in the area 26. When either of said areas 25 and 26 are moved by the rotation of the cap 10 to be acted upon by the said tool 10 depending upon the direction of rotation of the cap 10, there will be a crossing and overlapping of lines. However, there will be as indicated above a greater number of lines extending in one direction than in the other.

Since the tool 17 is rotating in operation, the surface 24 thereof will be continuously distorted out of round into a more or less elliptical shape in order to conform to the surface of the cap engaged thereby and the microscopic lines formed by the abrasive material will be arcuate rather than on an arc of a radius. Therefore, the said excess lines will be of arcuate form extending generally at an angle to the longitudinal axis 13 of the cap with the lines 27, 28 on the sides of the opening 29 of the tool extending at an angle to each other and the said axis 13 of the cap. The line 28' in the intermediate portion is of a width equal to the opening 29 and will extend more or less generally in the direction of the said axis 13, thus forming in effect three definite areas 11, 11' and 11" of microscopic lineations with the areas on either side of the intermediate area equal to each other. As previously stated, after one complete revolution of the cap 13 has been made the tool 17 is removed to be advanced and generate similar surface areas, thus providing the groups 14 above referred to.

In some instances the tool 17 may be advanced relative to the rotation of the cap 10 in a manner similar to that of cutting a thread so that a helical band area the width of the tool will be made of the surface of the cap 10, thereby providing for a different effect than that above described for the circumferentially extending groups 14.

I claim:

1. The method of ornamentating an article having a cylindrical surface which comprises rotating the said article about its cylindrical axis, using a deformable, hollow, cylindrical abrading tool, holding said tool with its axis at substantially right angles to the axis of rotation of said articles at one side of the axis of said work and with its end engaging the article with sufficient pressure applied toward the article to deform the engaging end of said tool to cause the said end to conform generally to the curvature of the surface of the article during engagement therewith and rotating said tool at a much higher speed than the rotating of said article and at the same time traversing said tool along said article.

2. The method of surface ornamentation as in claim 1 wherein said traversing is step by step along said article with a removing of said tool from engagement with said article during the movement of the said traversing of said tool.

3. The method of surface ornamentation as in claim 2 wherein said tool is held in engagement with said article for at least one revolution thereof.

ERNEST MILLMATHER, Jr.

REFERENCES CITED

The following references are of record in the file of this patent:

UNITED STATES PATENTS

| Number | Name | Date |
|---|---|---|
| 1,792,829 | Goin | Feb. 17, 1931 |